United States Patent [19]
Grunsted et al.

[11] Patent Number: 5,836,493
[45] Date of Patent: Nov. 17, 1998

[54] VEHICULAR MOUNT FOR CARGO CARRIER

[75] Inventors: Michael P. Grunsted, 1555 Deerfield Dr., Oshkosh, Wis. 54904; Peter M. Schingen; Paul R. Walker, both of Winnebago County, Wis.

[73] Assignee: Michael P. Grunsted, Oshkosh, Wis.

[21] Appl. No.: 801,849

[22] Filed: Feb. 21, 1997

[51] Int. Cl.[6] ...................................................... B60R 9/06
[52] U.S. Cl. .......................... 224/519; 224/511; 224/521; 224/524
[58] Field of Search ................... 224/495, 504, 224/511, 519, 521, 523, 524

[56] References Cited

U.S. PATENT DOCUMENTS 4,971,509  11/1990  Sechovec et al. ...................... 224/521

Primary Examiner—Renee S. Luebke
Attorney, Agent, or Firm—R. Jonathan Peters

[57] ABSTRACT

A mount for supporting a cargo carrier to a vehicle having a standard receiver hitch, comprises a receiver bar adapted for connecting with the receiver hitch, and first and second plate members generally vertically disposed and affixed to the receiver bar. The plate members have, at least over a portion thereof, substantially planar surfaces for adjacent abutment thereof. A rigid member such as a crosspiece, yoke, or bracket, is affixed to the outermost plate member, and a carrier supported by the rigid member is cantilevered from the mount.

14 Claims, 16 Drawing Sheets

VEHICULAR MOUNT FOR CARGO CARRIER

FIELD OF THE INVENTION

This invention relates to a vehicular load carrying mount or support system. In a more specific aspect, this invention relates to a support apparatus secured to a vehicle and from which is mounted a cargo carrier adapted to receive, hold, and transport a load.

BACKGROUND AND PRIOR ART

A variety of designs or systems for cargo carriers attachable to the exterior of motor vehicles have been proposed and many have become commonplace and are in wide use. Most commonly, cargo carriers are connected or coupled to the rear of the vehicle, and typically attached to a trailer hitch or vehicle bumper. One such type of carrier is cantilevered from the bumper or trailer hitch of the vehicle. These tailgate type carriers, disposed outside the vehicle, are versatile, and provide suitable means for transporting extra or bulky loads. Thus, it has long been recognized that a carrier is advantageous in that it provides extra storage capacity for transporting cargo, or increases the carrying capacity of a vehicle such as with today's smaller or more compact vehicles having limited storage capacity, or provides carrying capacity for relatively large, heavy, or bulky items. Because of this carrying capacity, cargo carriers are therefore utilized for supporting and transporting a wide variety of items or materials, such as trunks, luggage, clothing, food, beverages, recreational and sports equipment (e.g., bicycles, skis, and camping equipment), furniture, spare tires, lawn and garden equipment, etc.

Useful types or systems of cargo carriers shown in the prior art mounted on the front or rear of a vehicle are connected to a vehicle receiver hitch or to the bumper and cantilevered therefrom in a substantially horizontal plane. Representative carriers of this type of system are disclosed in U.S. Pat. Nos. 5,439,151; 5,181,822; 5,460,304; and 5,458,389. However, such vehicular attachable carriers known or disclosed in the art most typically comprise a mount and an integrally dependent rack, platform, or the like, for supporting and transporting a load. That is, for a carrier of this design or system, a platform depends from, and is integral with, or unique to the mounting means connected to the hitch or to the bumper. Thus, this type of carrier system is disadvantageous in that the load support means (i.e., carrier) being integral with, or unique to, the mounting means restricts or limits the carrier or platform to a design or configuration adaptable or compatible with the mounting apparatus; that is, there is essentially no allowance or margin for utilizing or adapting to the system different types or designs of platform or carriers, or to interchanging the system with different types of vehicles (e.g., sedan, truck, van, station wagon, etc.).

There is disclosed in U.S. Pat. No. 5,460,304 a carrier system comprising a pair of articulated tubular supports telescopically engageable with the trailer hitches. The system includes a first cargo carrier with guide channels for receiving tubular supports, and a second cargo carrier telescopically engaged with opposite ends of the tubular supports. It will be observed that the system requires two trailer hitches, and appears to be cumbersome and complex.

A support apparatus of a motor vehicle tailgate rack is disclosed in U.S. Pat. No. 4,413,761. The support apparatus comprises a back plate, which is attached to a bumper, parallel side walls and a partition forming a socket for the bumper rack in a vertical position, and a bottom wall and parallel side walls define a second socket for a horizontal or vertical bumper rack. The apparatus appears to disclose a relatively complicated connection to the bumper, and is limited to a rack of a specific design or configuration.

U.S. Pat. No. 4,610,458 discloses an apparatus for mounting a carrier having a series of straps attached at one end to the bumper, and extending outwardly to define a horizontal support on which to mount a carrier. This apparatus is limited to a bumper mount.

U.S. Pat. No. 4,971,509 discloses a carrier for handicapped vehicles, comprising a pivotal plate assembly attached to the trailer hitch. This system is limited to the specific use, as are U.S. Pat. Nos. 3,343,736 and 3,425,605 which are specific to tire carriers. The '736 patent discloses a tire carrier mounted to the bumper, comprising a vertical plate attached to the bumper, and a U-bracket to which is hingedly connected a carrier body. The tire carrier in the '605 patent comprises a vertical plate affixed to an angled post connected to the bumper, but has no adjustable connection.

This invention has therefore as its purpose to provide an apparatus for securing or mounting from a vehicle a cargo carrier of versatile design and utility, whereby the mounting apparatus not being delimiting to a particular configuration or to a particular vehicle, the cargo carrier can be designed or adapted to receive and transport a wide variety of loads or cargoes for many different vehicles.

SUMMARY OF THE INVENTION

In accordance with the present invention, there is provided a mount for securing or supporting a cargo carrier from a vehicle having a conventional or standard receiver hitch. The apparatus comprises a hitch connecting means adapted for connecting with the receiver hitch, and a first plate generally vertically disposed is affixed to the hitch connecting means. The first plate has, at least over a portion thereof, a substantially planar surface disposed outwardly from the hitch connecting means. A second plate, generally vertically disposed, is mounted rearward or outward to the first plate, and the second plate has a substantially planar surface, at least over a portion thereof, for substantially adjacent abutment with the planar surface of the first plate. The two plates, having flat mating surfaces contacting each other, are affixed or adjoined at the zone of abutment as by welding, or by mechanical fastening means (e.g., threaded bolts and nuts), or both. Further, the apparatus or mount assembly includes means for securing or supporting a cargo carrier or platform depending transversely from the mount assembly in a generally horizontal plane. One or both plates can be polygonal, elliptical, or round, and need not be of equal area dimensions, but the zone of abutment between the two planar surfaces should be sufficient to provide an adequate and sturdy connection between the two members sufficient to support a carrier and its intended load. Also, it should be understood that describing the plates as having substantially planar surfaces is not intended to mean that the complete area of each of the plate surfaces is planar, but rather that a sufficient area of each plate is planar to provide mating surfaces and thereby achieve the desired result.

In a preferred embodiment of the invention, the two plates are of a generally rectangular configuration, and the outward facing of the second plate is substantially planar. The vertical marginal edges of the two plates about coincide.

As used herein and in the appended claims, the term "carrier" is intended to mean platform, rack, support, load receiver, and like means for receiving and transporting a load, and all of these terms are used synonymously and interchangeably.

In a preferred embodiment of the invention, the apparatus comprises a horizontally disposed receiver bar, as the hitch connecting means, adaptable for connecting or attaching to a standard type hitch. The receiver bar is affixed as by welding to a vertical receiver plate as the first plate, having a substantially planar surface or facing disposed outward from the receiver bar. A frame plate as the second plate, also being vertically disposed, is provided with a substantially planar surface for mating engagement or abutment with the substantially planar surface of the first plate and over a substantial area of the two plates. As a modification, the second or frame plate is adjustably mounted to the first or receiver plate, whereby the height of the second plate can be adjusted relative to the receiver bar, or can be adjusted for accommodating the desired level of the cargo carrier, which can vary depending upon such factors as the vehicle model or the carrier design or configuration. Where desired, the two plates may be connected as by a hinge-like means or articulated joint, such as by providing complementary load bar and slot elements. When such a connection is utilized, the second or frame plate is provided with an elongated member such as a horizontal rod or bar positioned adjacent to and parallel with the top marginal edge of the frame plate, and the first or receiver plate is provided with spaced transverse members or flanges having aligned slots or recesses to receive the rod and retain the frame plate in abutting relationship with the receiver plate.

The apparatus or mount assembly is provided with suitable means for securing or supporting a carrier extending transversely from the plate members of the assembly and outwardly or rearwardly from the vehicle. This retaining or supporting means may comprise a bracket means depending from the frame plate (i.e., second plate), and a carrier is cantilevered from the bracket. The bracket may be formed separately and joined to the outer face of the frame plate, as by welding, or the bracket may be formed integrally with the frame plate. Alternatively, a yoke or crosspiece can be affixed to the frame plate or second plate as by welding, and a generally horizontally disposed carrier means, such as a tubular support assembly, depends transversely from the yoke. This type of carrier would be particularly useful for providing a facile connection of modular components which may be selectively interconnected to increase the load carrying capacity or to accommodate a support rack specific for supporting and transporting certain types of items or equipment such as bicycles or skis. Additionally, the mounting apparatus of the invention might be useful for carrying a spare tire by welding a piloting ring to the frame plate for supporting a tire, and providing a retaining ring for abutting the piloting ring.

Where desired, a platform comprising a yoke, having spaced lateral tines extending downwardly and outwardly therefrom, is welded to the frame plate. The free end of each tine is adapted for telescopic and connecting engagement with a modular component, thereby providing a cantilevered platform. The yoke and tines can be formed integrally (as a single unit), and the outward extending members of the tines can be of sufficient length to form a platform. Where desired, a case or trunk is provided with elongated channels or tubular receptacles at each bottom edge, and the tines are inserted into the channels, thereby securing the cargo case in place.

BRIEF DESCRIPTION OF THE DRAWINGS

The invention and its advantages will be more readily understood by reference to the following detailed description and exemplary embodiments when read in conjunction with the following drawings, wherein.

DETAILED DESCRIPTION OF THE INVENTION AND PREFERRED EMBODIMENTS

Figure 1:
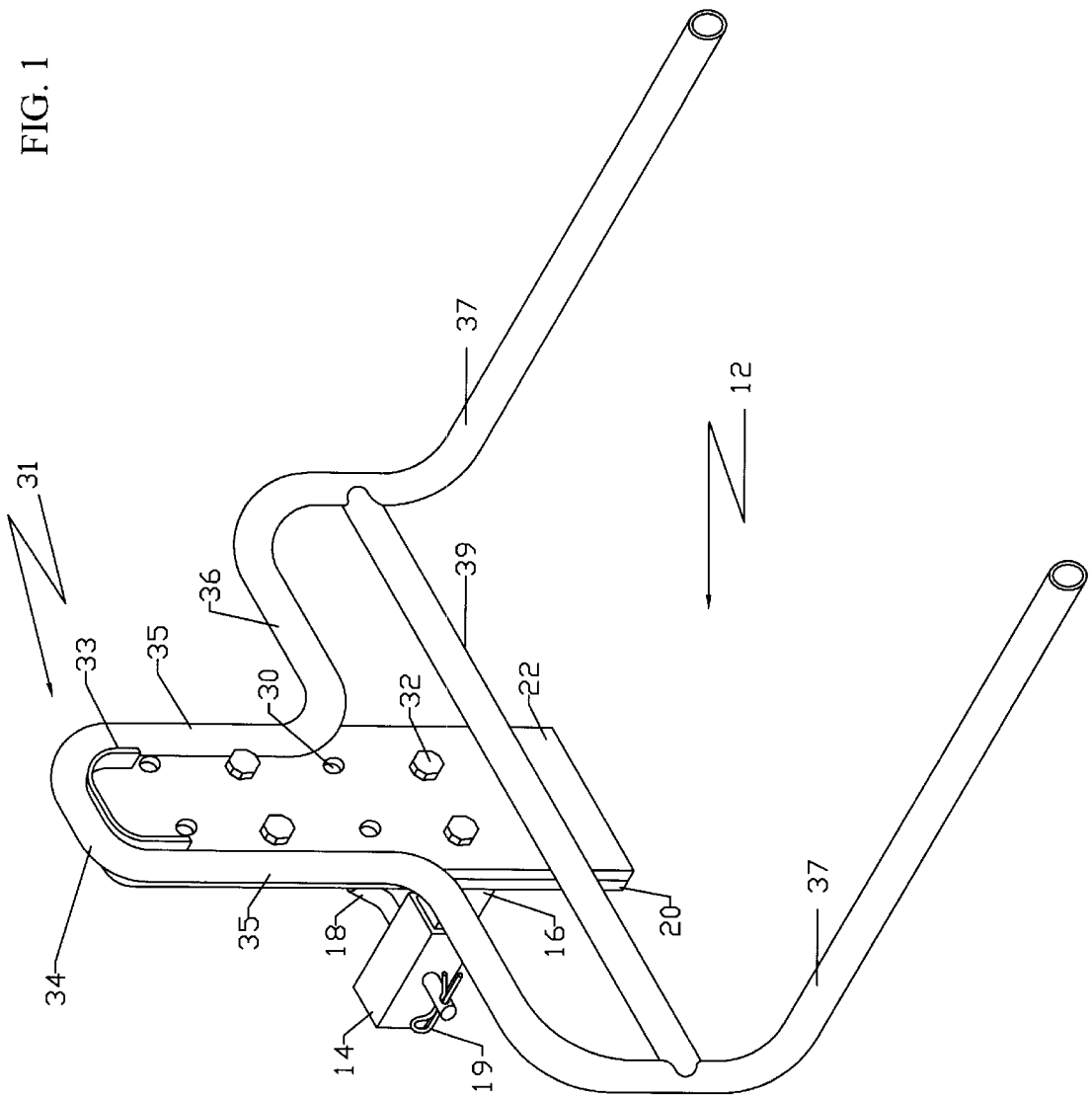
FIG. 1 is a perspective view of a mount apparatus for supporting a cargo carrier and embodying the features of the present invention.
Figure 2:
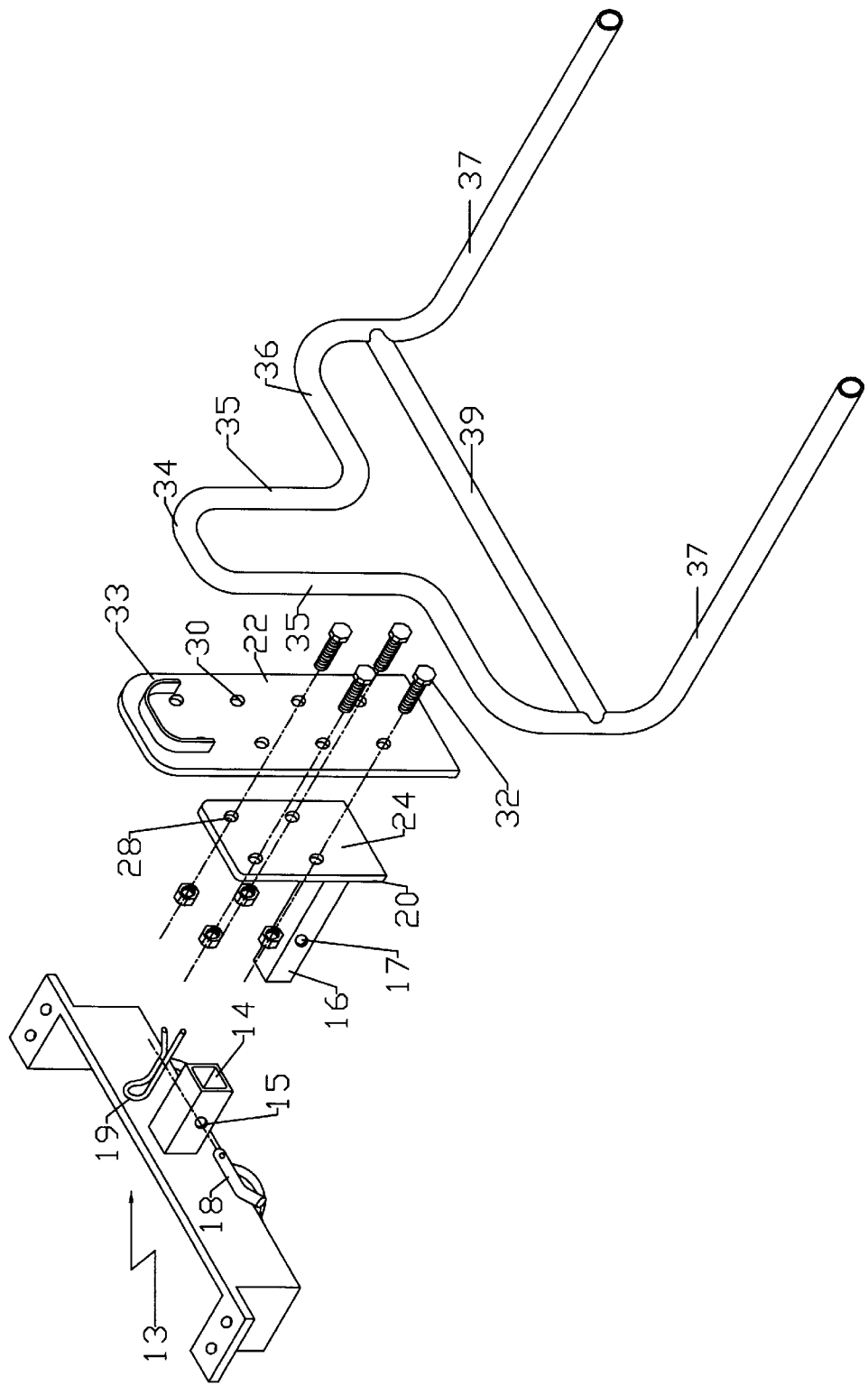
FIG. 2 is a perspective view of a mount apparatus of FIG. 1 showing a yoke and carrier platform joined or secured to the mount.

Referring to the drawings, wherein the same reference numerals refer to similar parts throughout the various views, there is shown in FIGS. 1 through 6 a mounting apparatus or device indicated generally by the numeral 12 and embodying the features of the present invention. An apparatus of this type is utilized for mounting a cargo carrier or platform onto a vehicle (not shown) equipped with a conventional or standard trailer tow package, indicated generally by the numeral 13, and having a standard trailer hitch 14. (See FIGS. 1 and 4). Although the mounting apparatus is described as being secured to the rear of an automobile, it should be understood that the mounting apparatus is applicable to most any vehicle, including, for example, automobiles, station wagons, jeeps, vans, trucks, snow mobiles, all-terrain vehicles, and the like, and also that the mounting apparatus can be secured to the front of the vehicle. It is significant to note, and will become better understood upon reading of the detailed description, that the mounting device for supporting a cargo carrier permits access to the automobile, such as in the case of a hatch back, the rear door is accessible, and also does not block the rear view for the driver unless the load is exceptionally high.

In accordance with the embodiment illustrated, a receiver bar 16, as the hitch connecting means, is adapted to be telescopically engaged with a complementary heavy duty, standard trailer hitch 14 attached to the frame rail (not shown), underneath the back of the vehicle. These two members, the trailer hitch and receiver bar, are usually constructed of steel, but any material that can support the load is suitable. As is well known in the art, a trailer hitch is typically tubular defining a longitudinal orifice or cavity, usually of rectangular or square cross-section, and the receiver bar is adapted to mate with (telescopically engage) the orifice of the hitch. The opposed walls of both the hitch and receiver bar have coaxially aligned holes 15 and 17, respectively, adaptable to receive a suitable fastening element. Thus, the receiver bar is attached or fixed to the hitch by conventional means, such as a with a conventional metal pin 18 and clip 19, having a high shear strength inserted through the aligned openings 15 and 17 in the hitch 14 and receiver bar 16. (See FIGS. 1, 2, and 6.) Suitable fastening elements of this type include, for example, a cotter pin or dog-legged pin and spring clip, cable ties, and threaded bolt and nut. Where desired, the receiver bar can be secured to the hitch by a wedge drawn against the receiver by turning an anchored, threaded bolt extending longitudinally through the bore of the receiver bar and of the hitch, so that tightening of the bolt will draw the receiver bar into secure engagement with the hitch, substantially as disclosed in U.S. Pat. No. 5,423,566.

Figure 3:
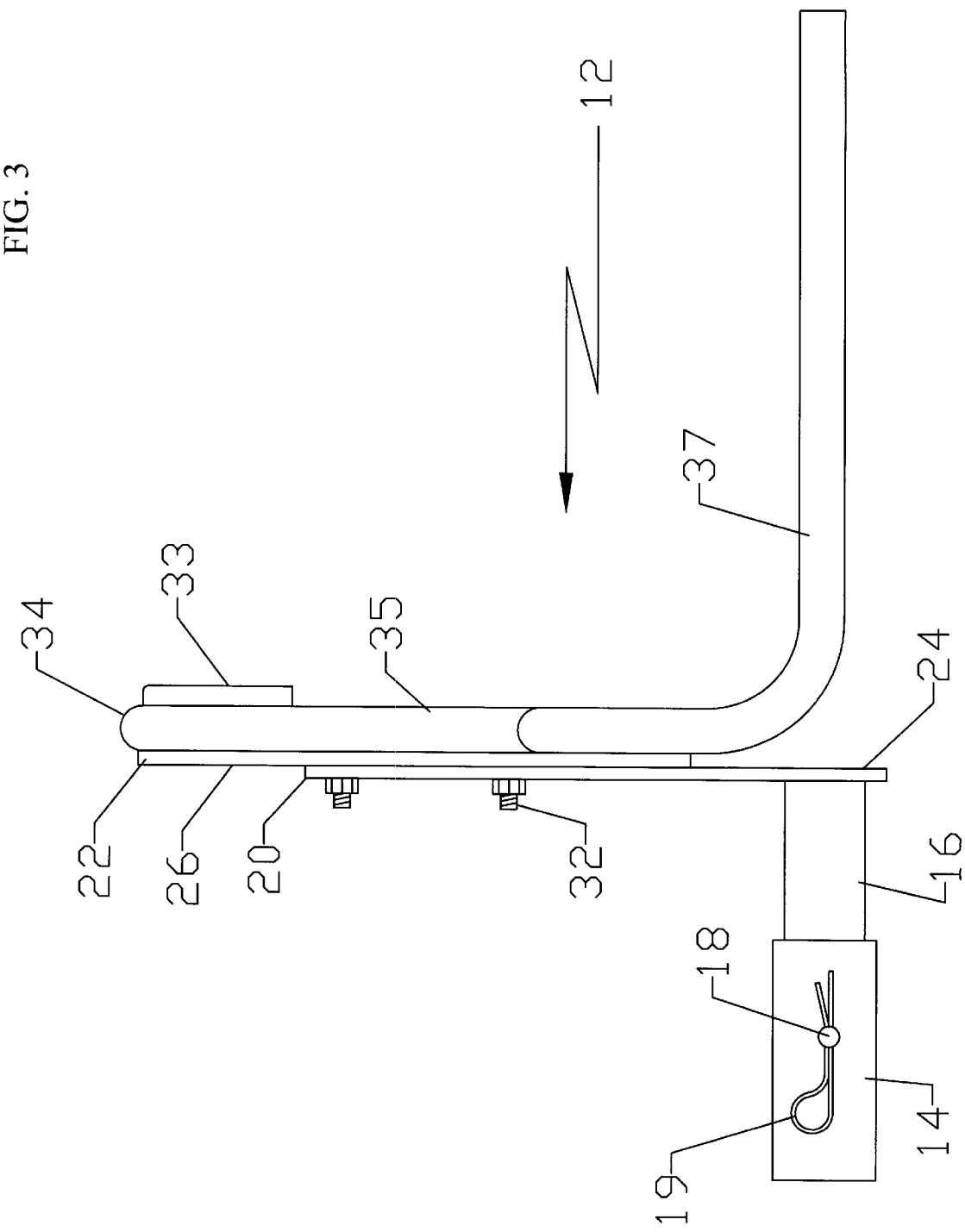
FIG. 3 is a side elevational view of the device of FIG. 2.
Figure 4:
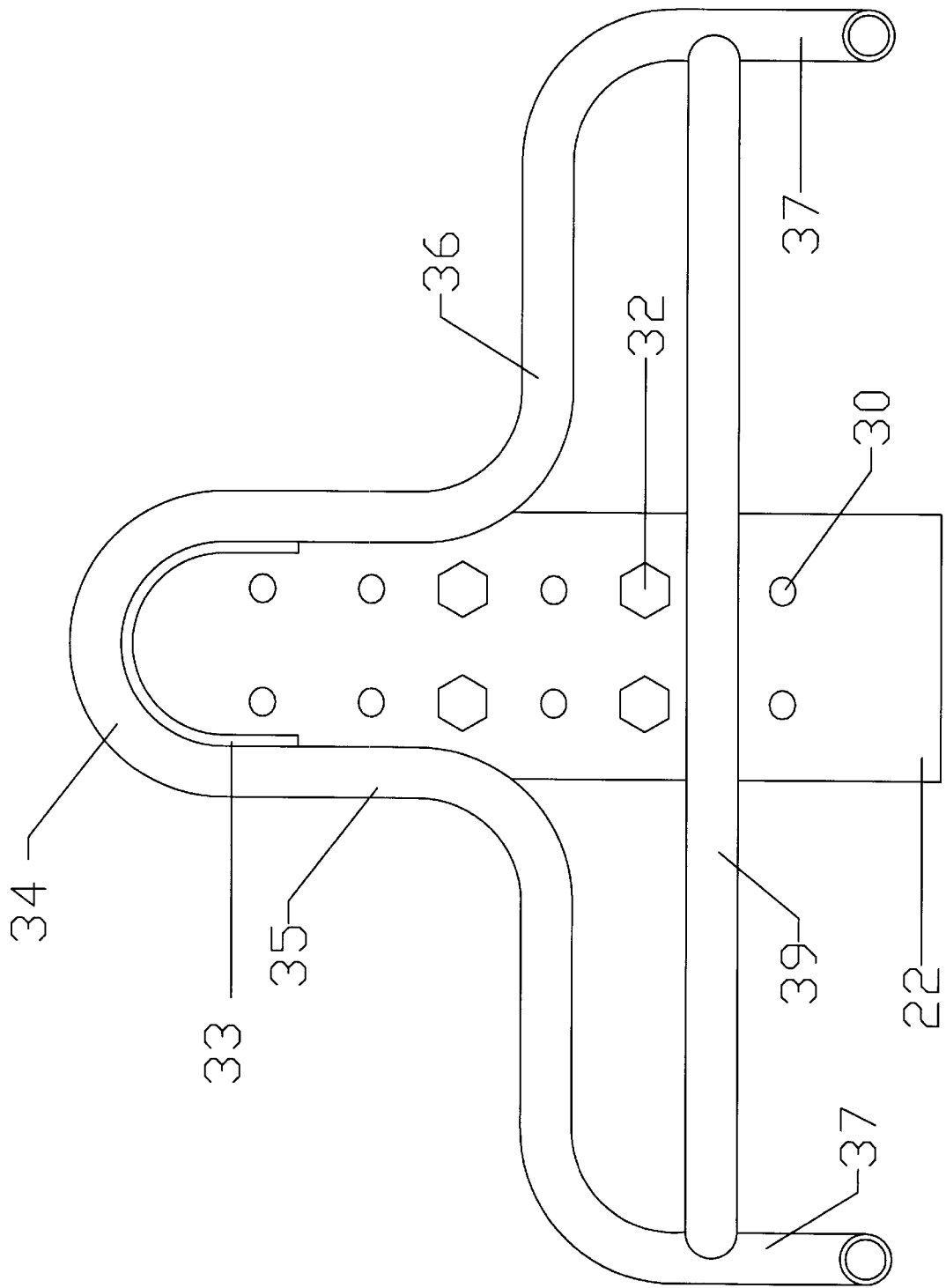
FIG. 4 is an exploded perspective view of the device of FIG. 2.
Figure 5:
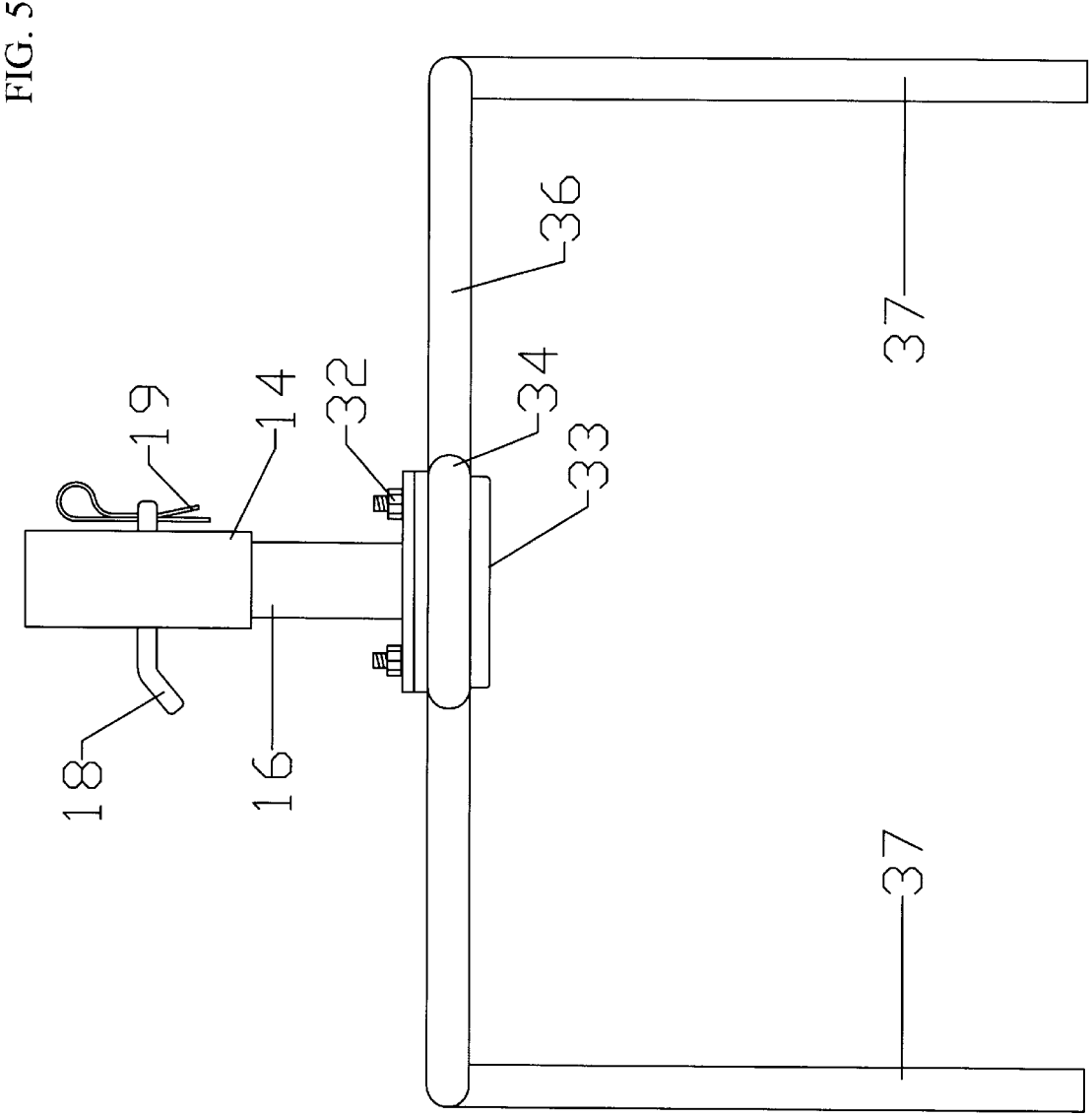
FIG. 5 is a front elevational view of the device of FIG. 2.
Figure 6:
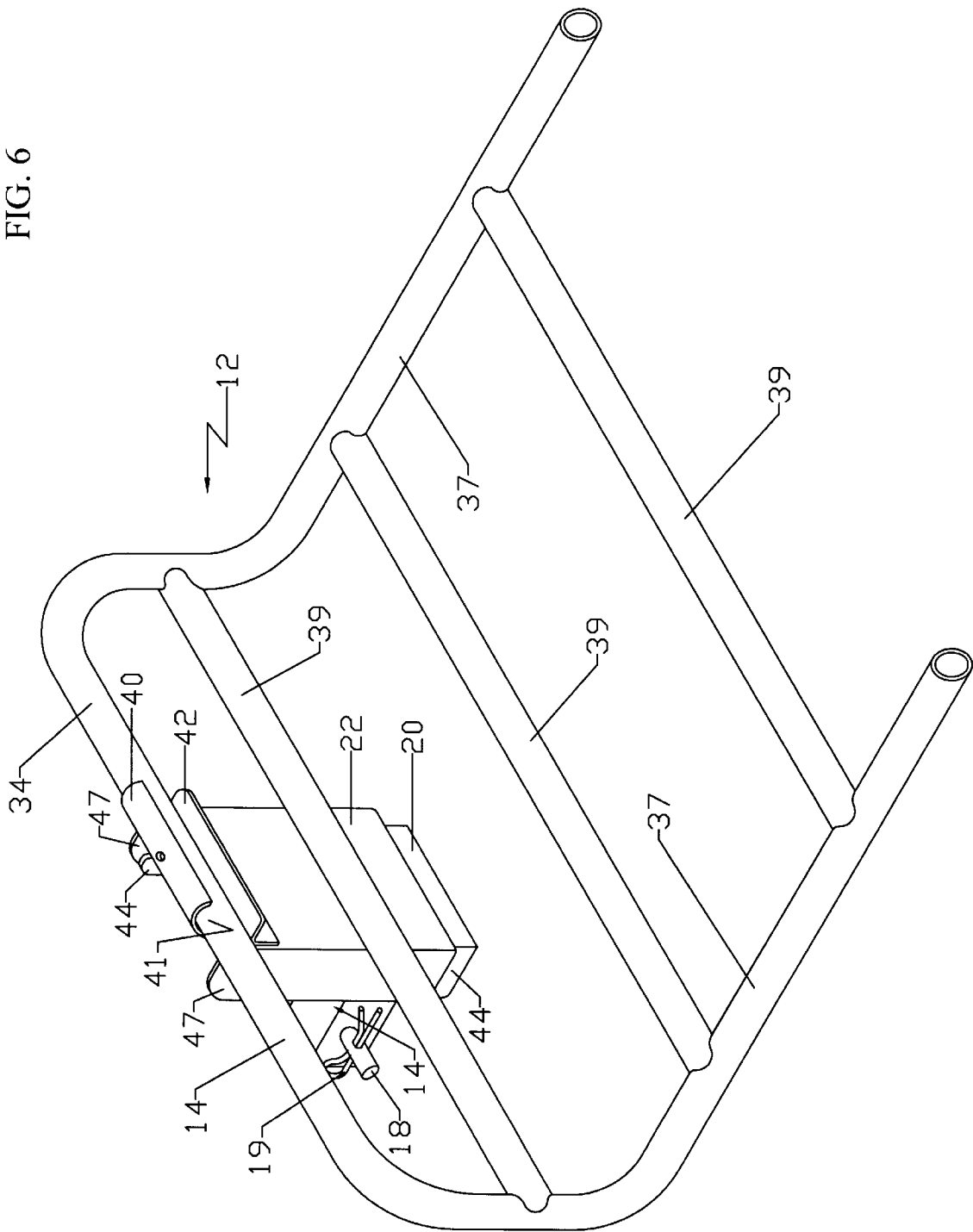
FIG. 6 is a plan view of the device of FIG. 2.
Figure 7:
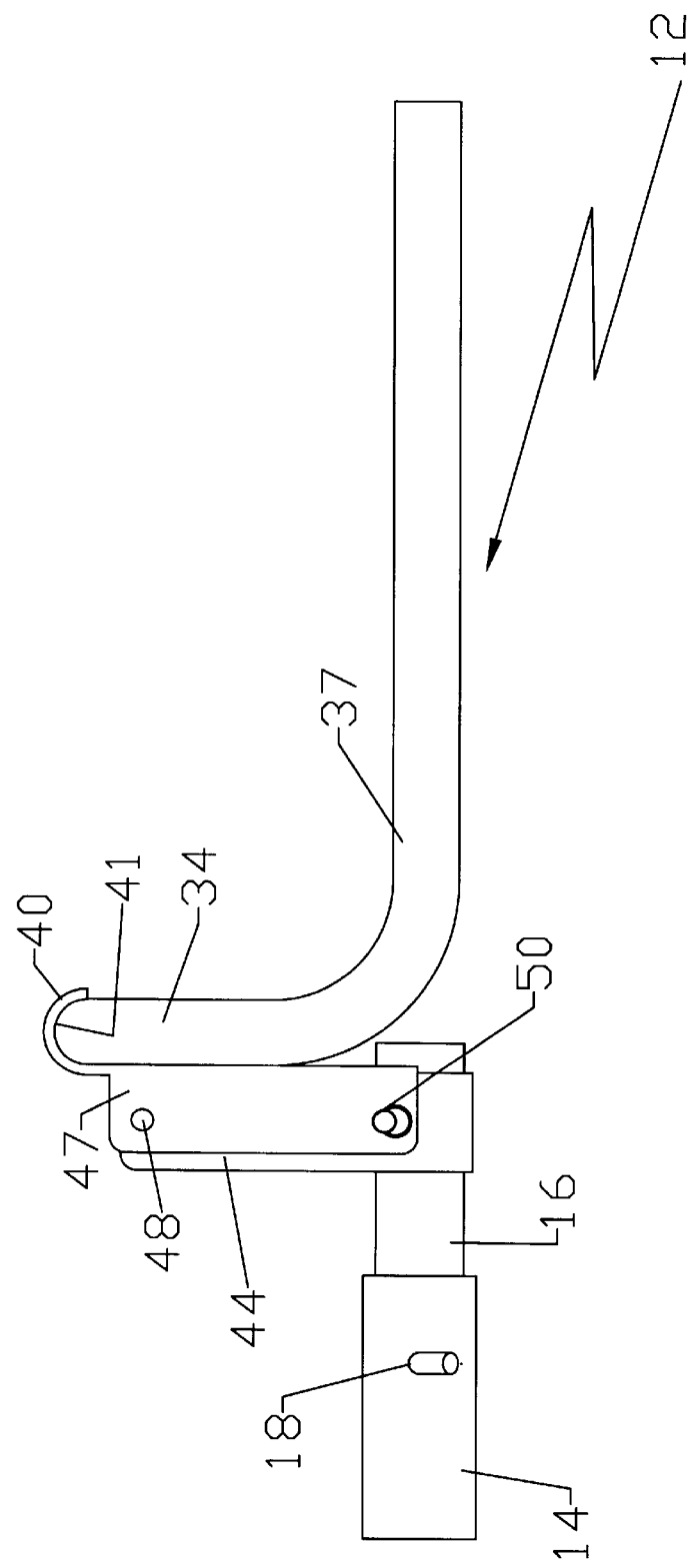
FIG. 7 is a perspective view of a modified form of the mount falling within the scope of the present invention.
Figure 8:
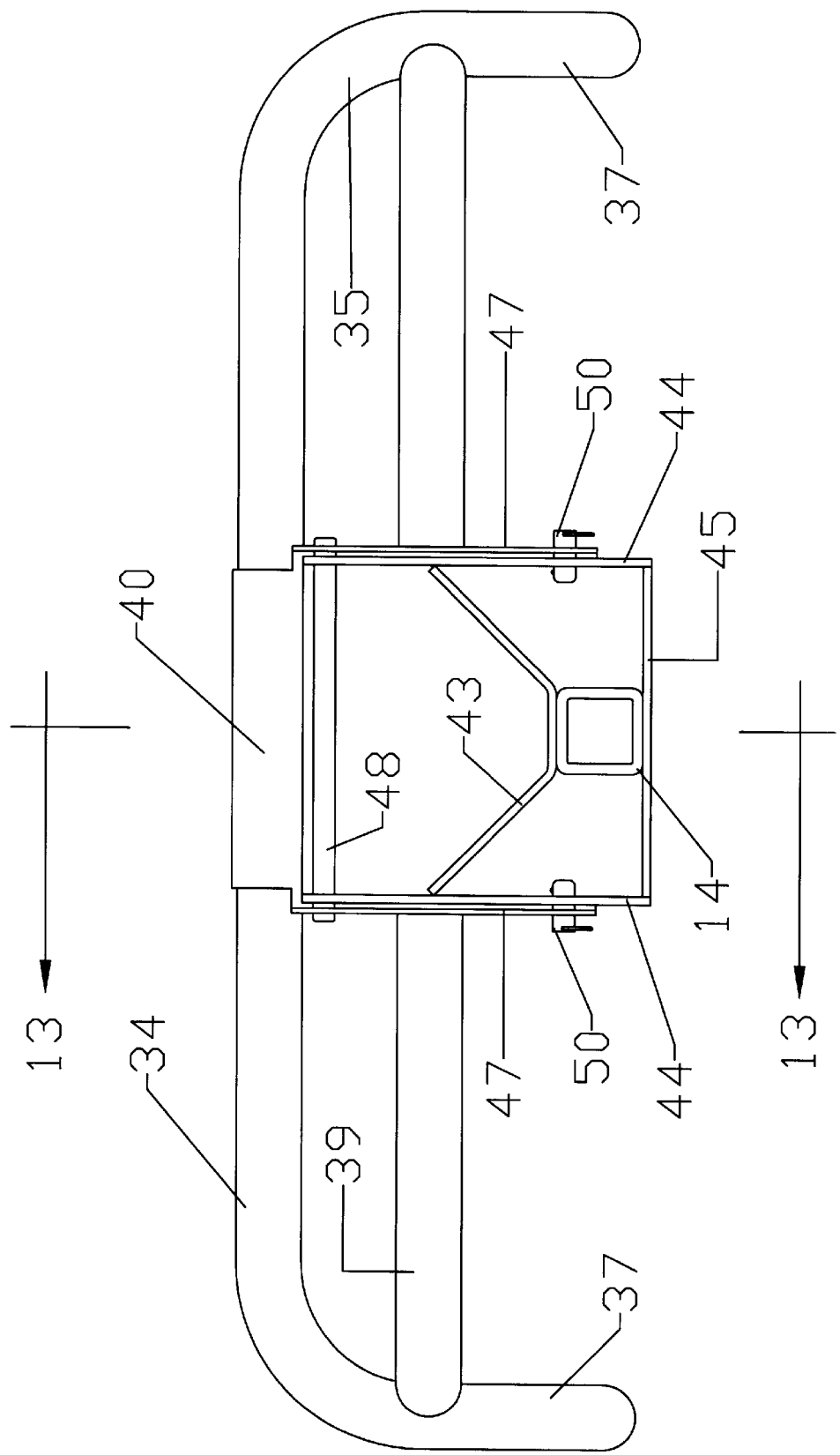
FIG. 8 is a perspective view of the mount of FIG. 7 but further modified to show a second hitch connection.
Figure 9:
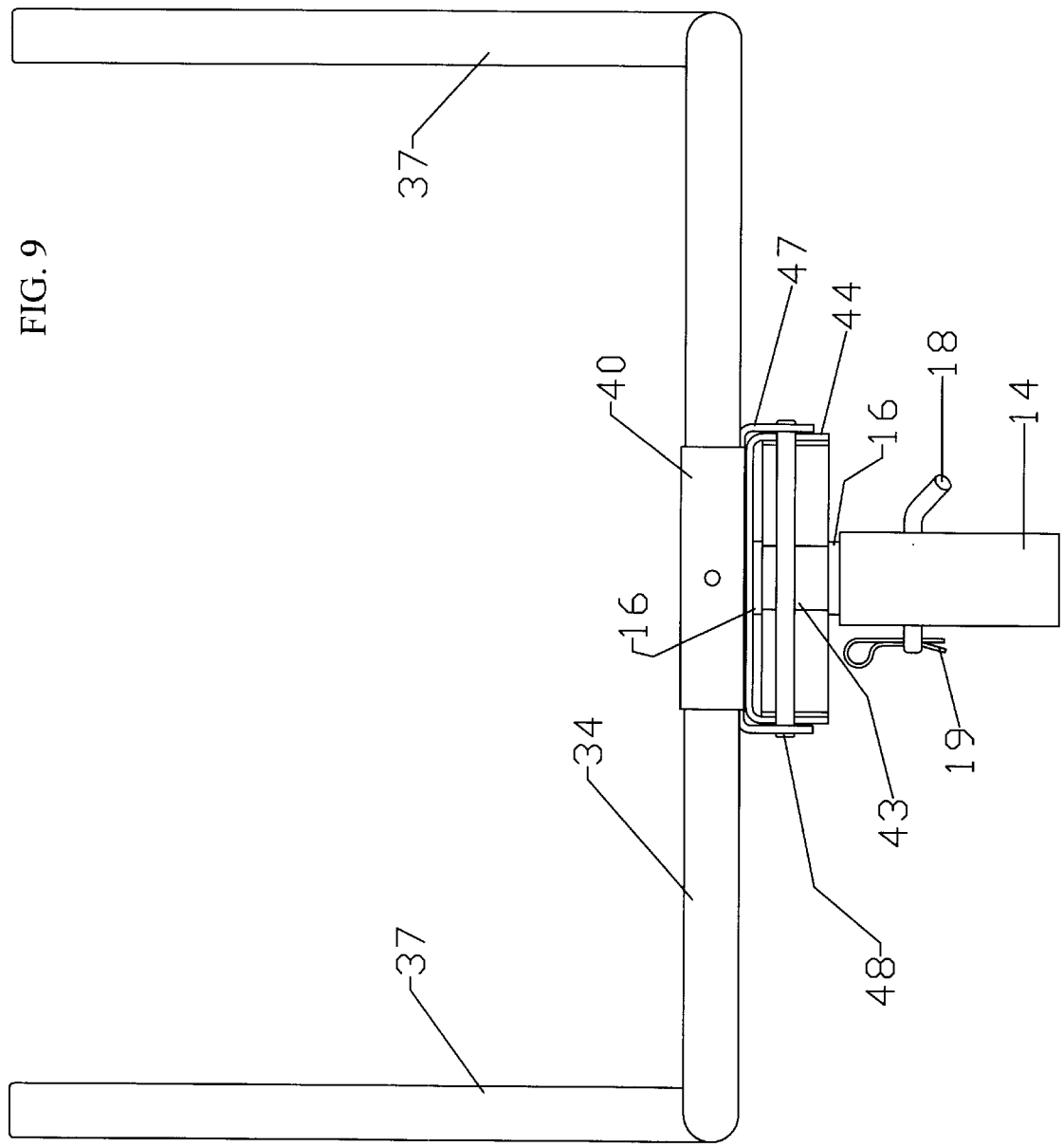
FIG. 9 is a sectional view taken on line 9—9 of FIG. 8.
Figure 10:
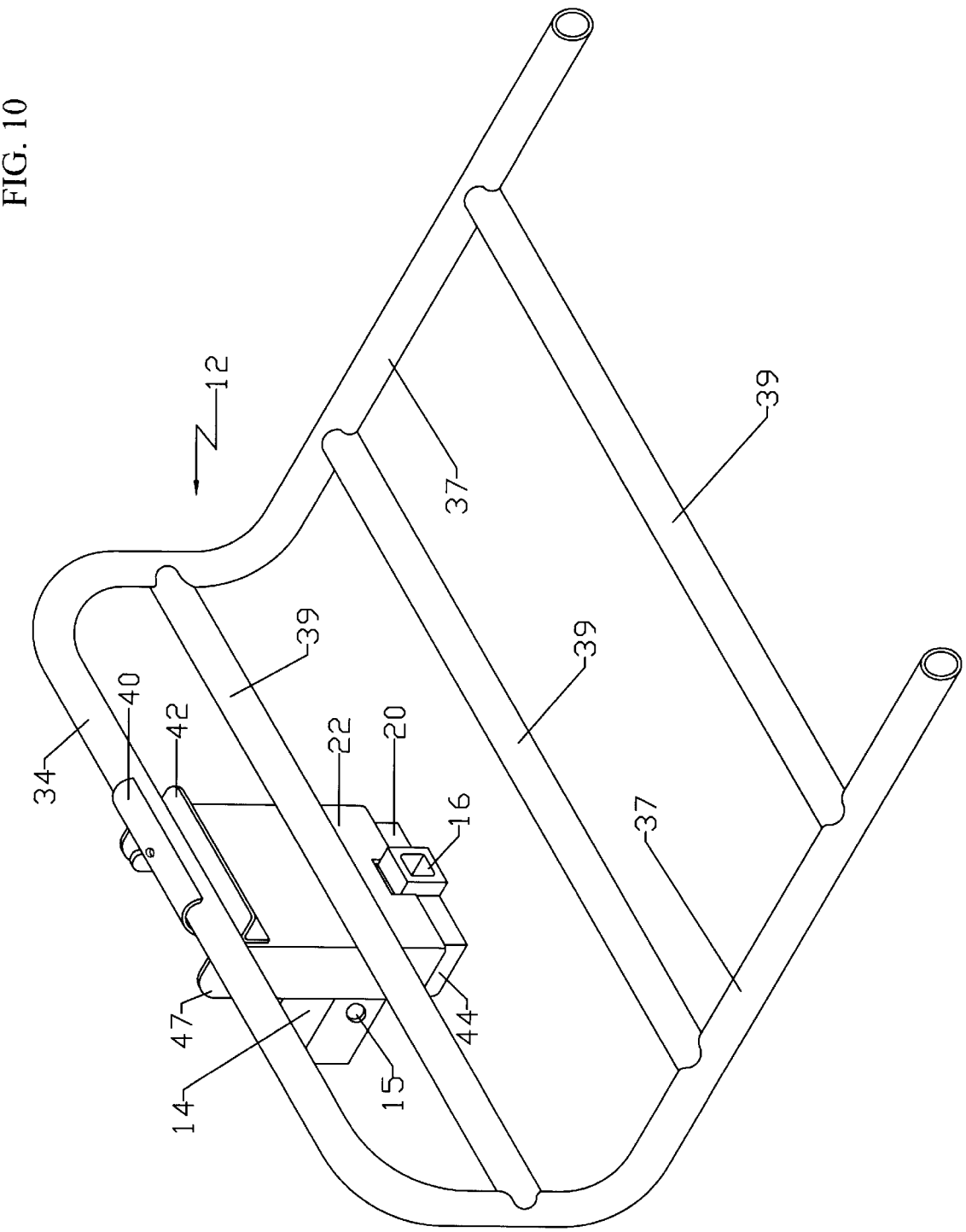
FIG. 10 is a perspective view of the embodiment shown in FIG. 8 and showing a yoke and carrier platform joined or secured to the mount.
Figure 11:
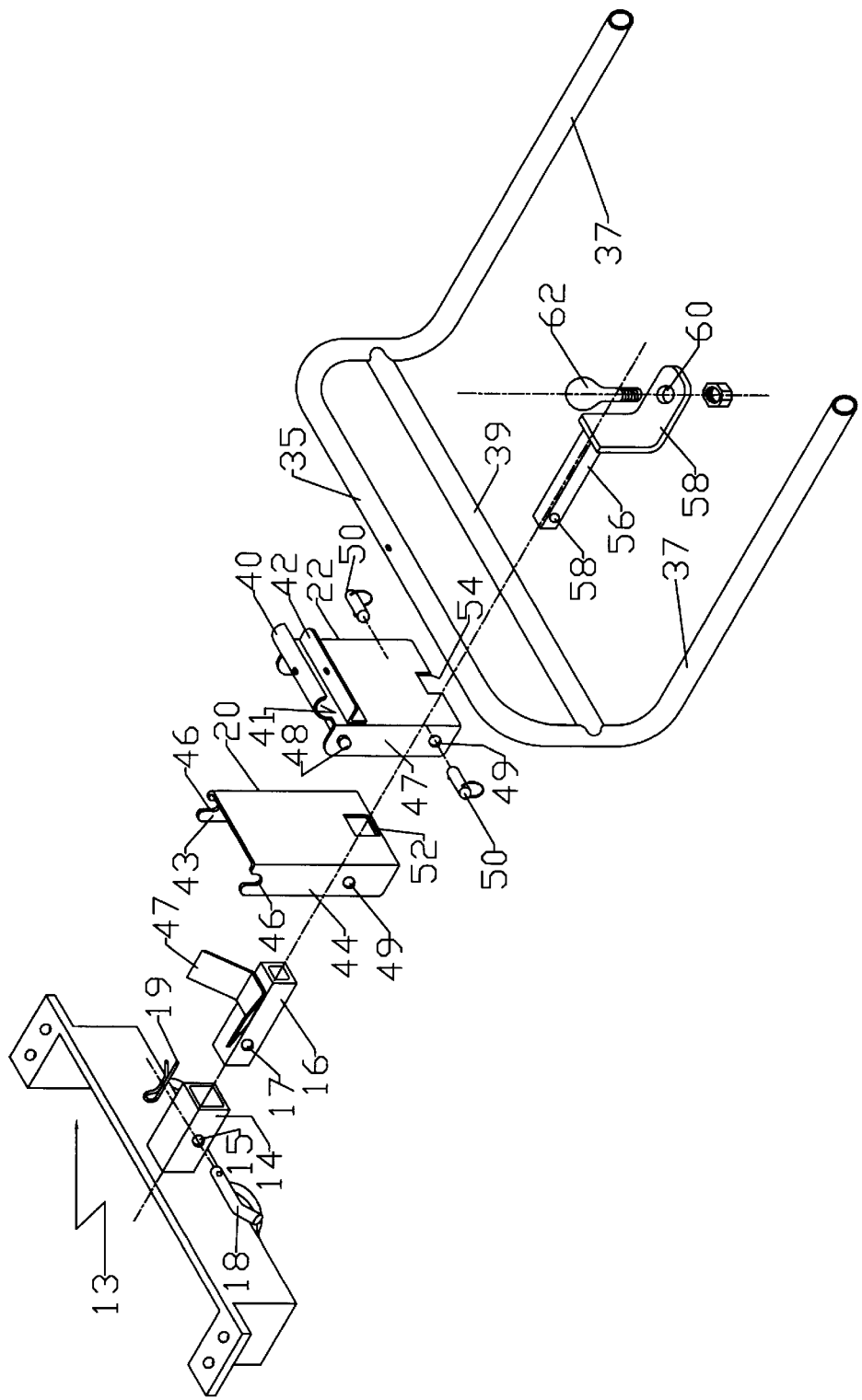
FIG. 11 is a side elevational view of the embodiment shown in FIG. 10.
Figure 12:
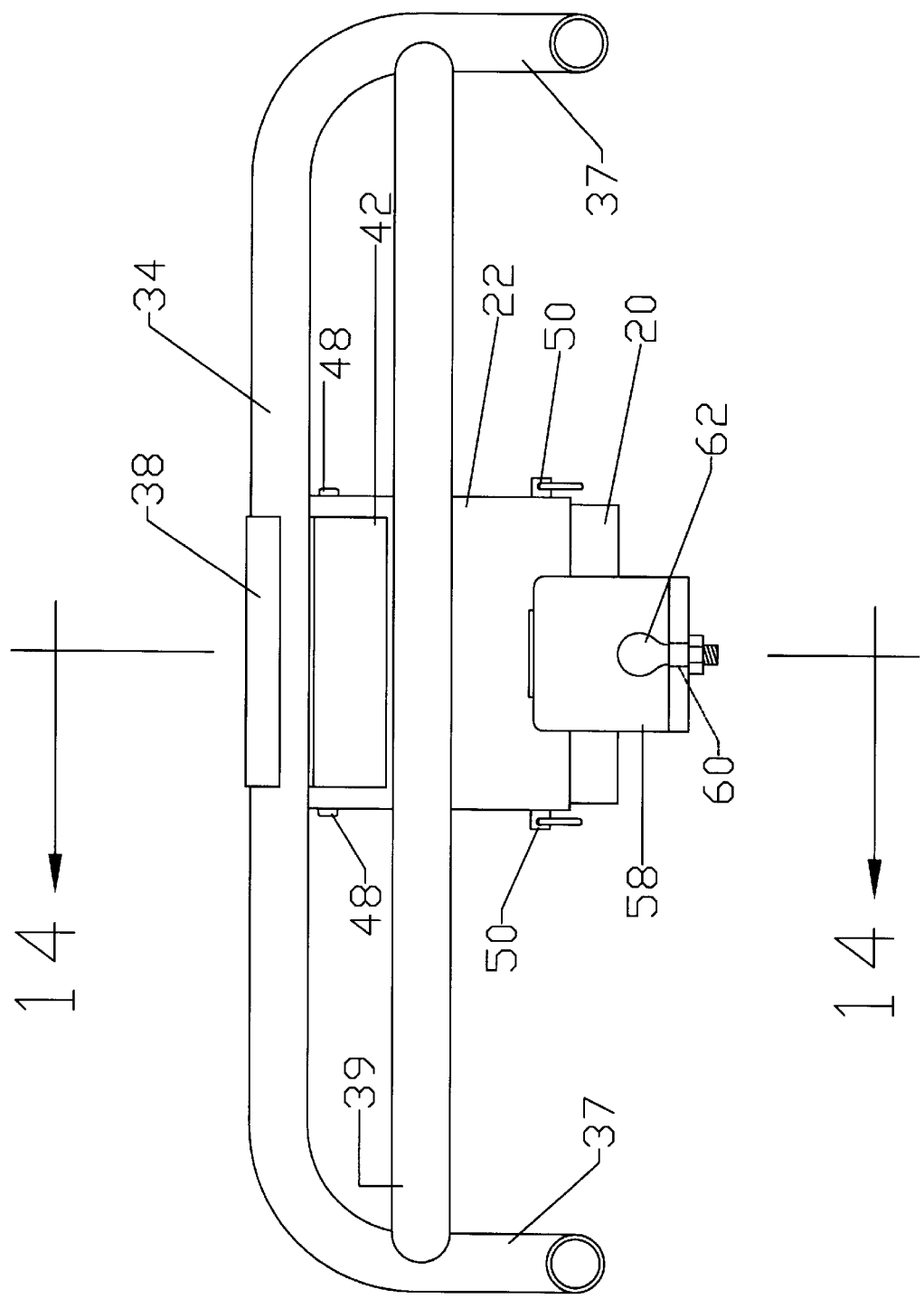
FIG. 12 is an exploded perspective view of the embodiment shown in FIG. 10
Figure 13:
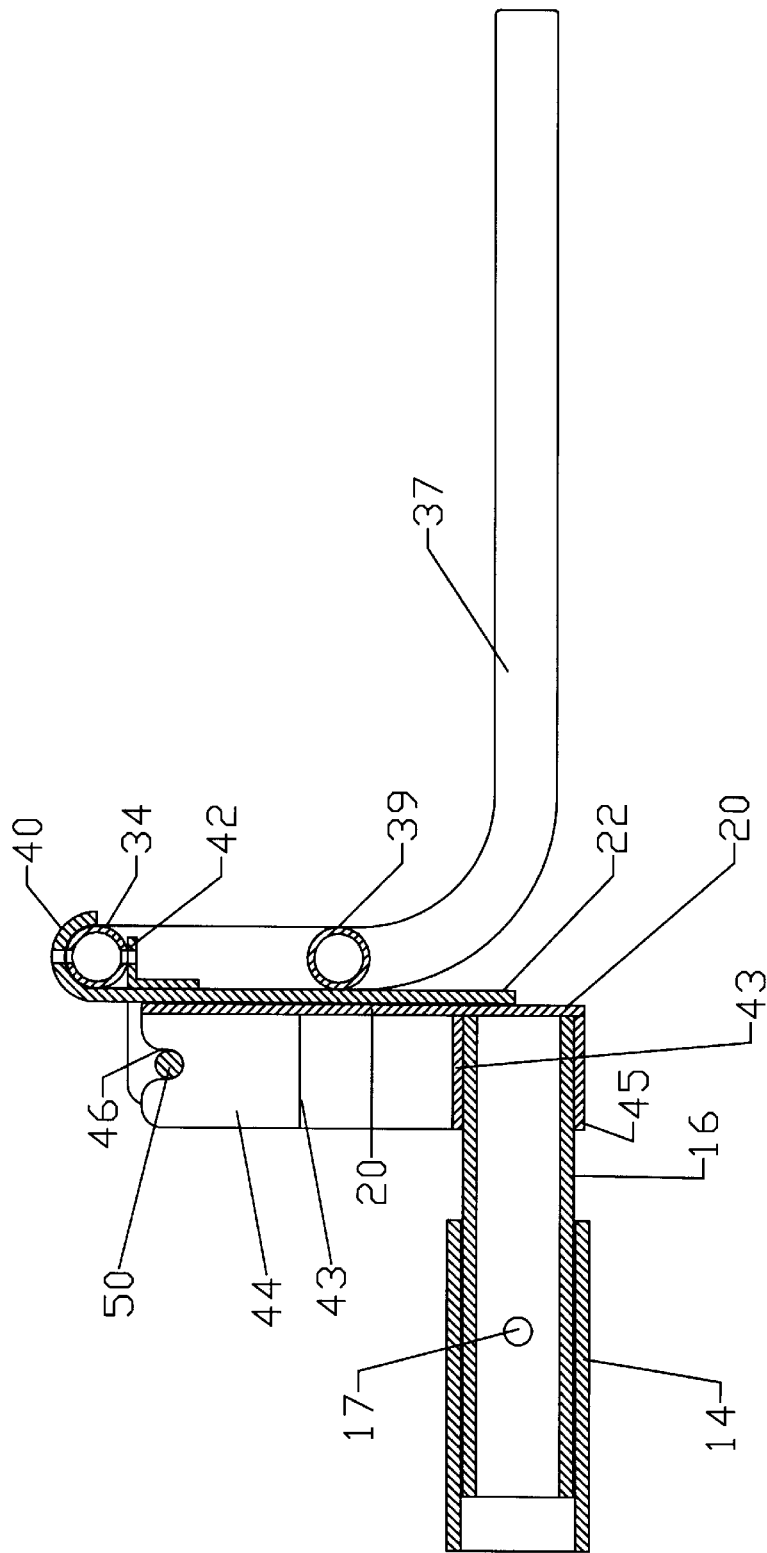
FIG. 13 is a front elevational view of the embodiment shown in FIG. 10.
Figure 14:
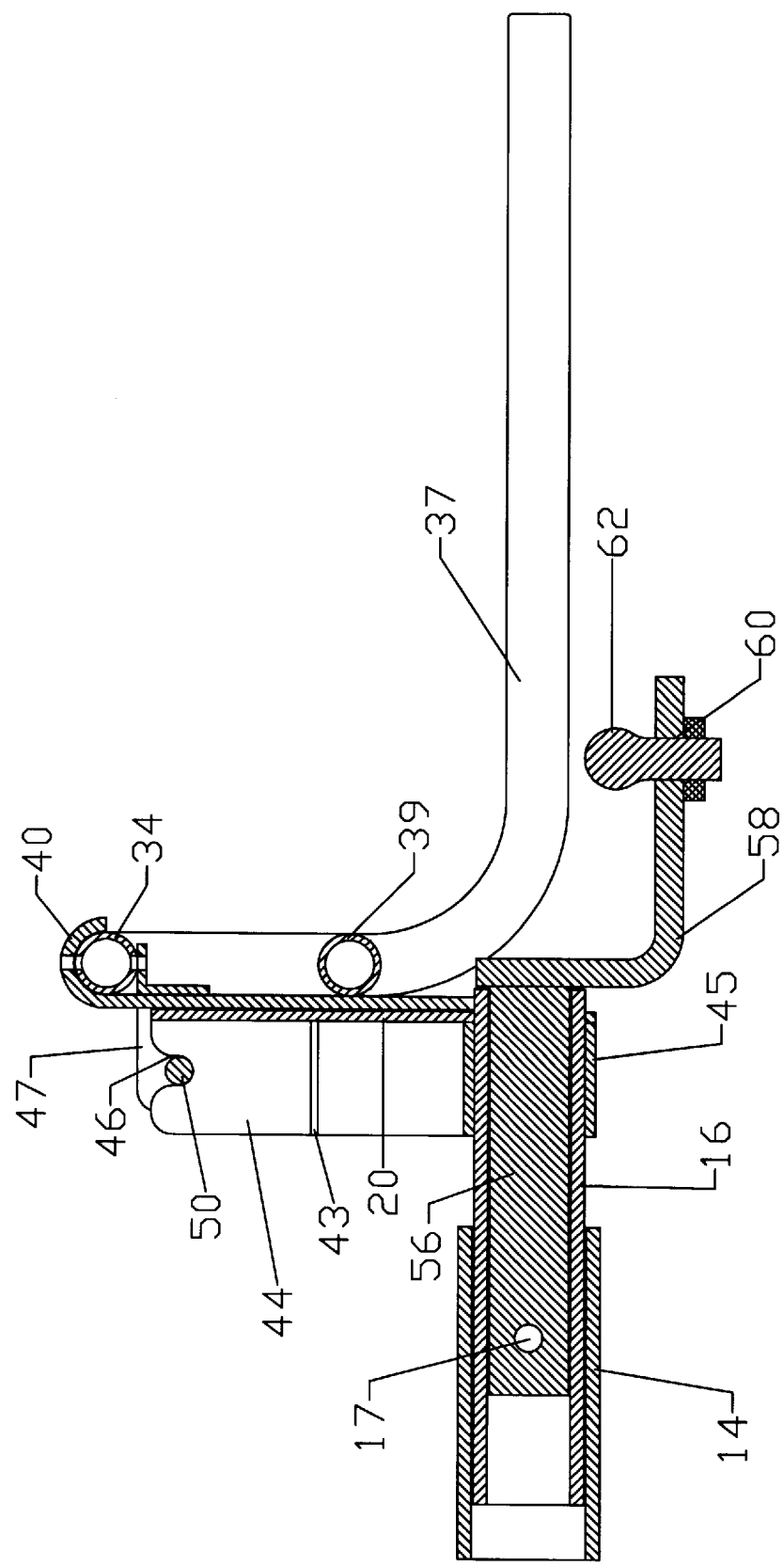
FIG. 14 is a rear elevational view of the embodiment shown in FIG. 10.
Figure 15:
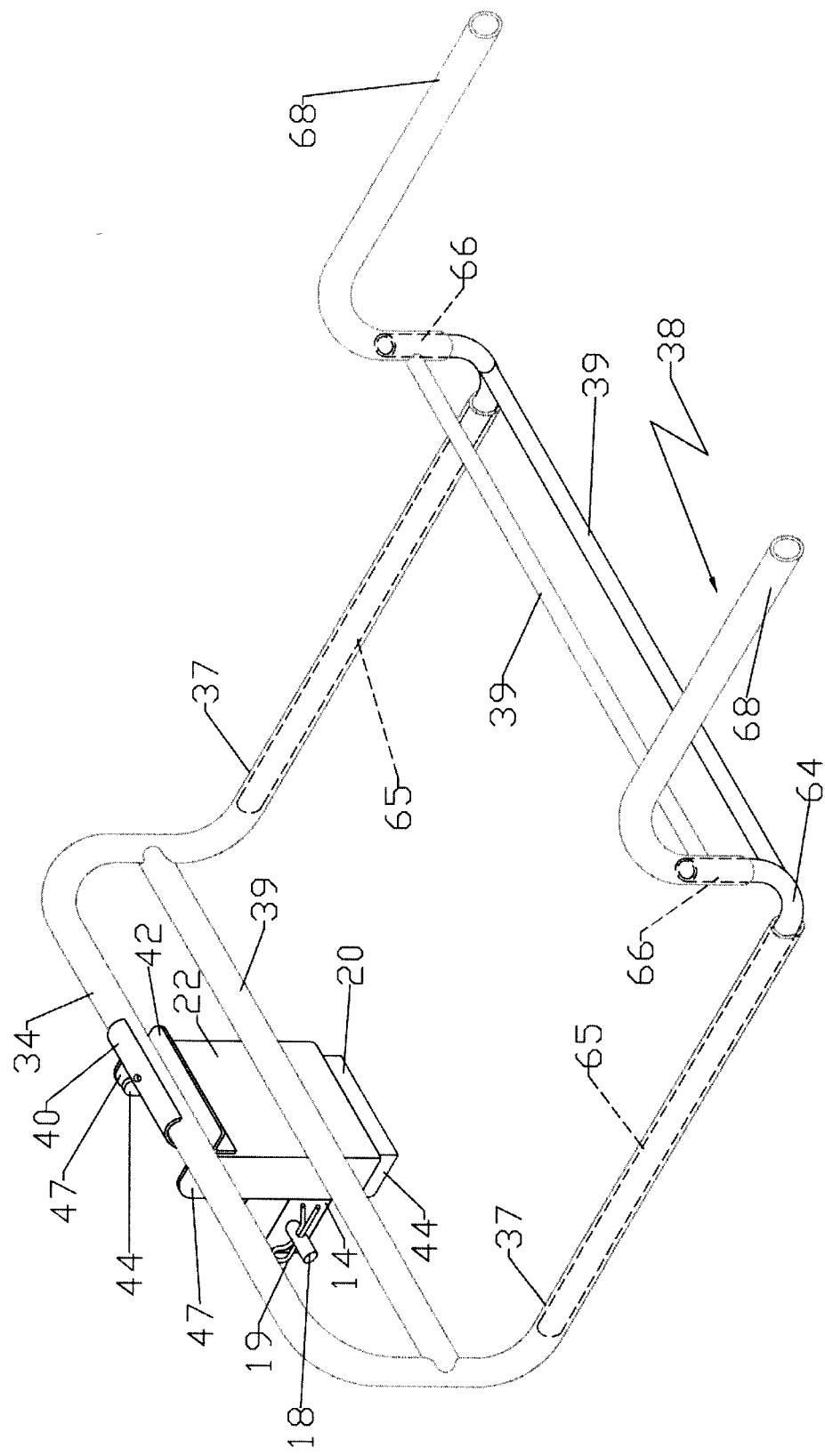
FIG. 15 is a plan view of the embodiment shown in FIG. 10.
Figure 16:
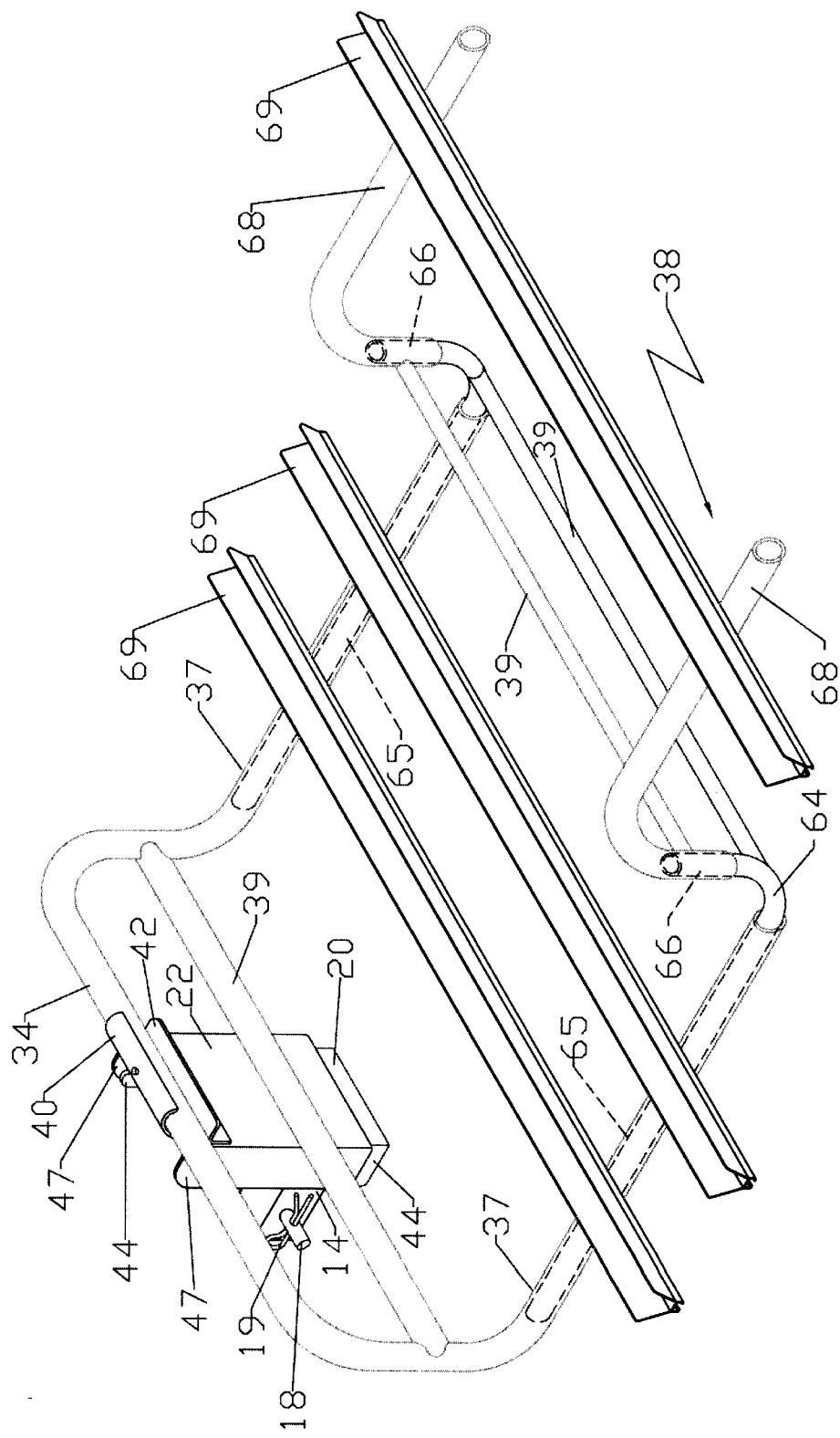
FIG. 16 is a sectional view of FIG. 11.

The mounting apparatus of our invention includes two generally vertical plates 20 and 22 adjoined at their facings, and disposed rearward of the receiver bar 16. It will be observed that the two plates as illustrated are essentially rectangular, but other area configurations are also applicable, such as elliptical or round, and further it should be understood that both plates need not have the same configuration. A meaningful portion of surfaces 24 and 26 of plates 20 and 22, respectively, are substantially planar so that when the plates are assembled, the planar areas of each surface 24 and 26 abut or contact, as shown in FIGS. 1 and 3, and are adjoined in order to provide a secure, fast, and stable attachment, as described herein below in greater detail.

The receiver plate 20, as the first plate, is attached to the receiver bar 16 by any suitable means such as by welding or by a conventional threaded nut and bolt (described above) extending through a hole in the plate and passing longitudinally through the receiver bar and hitch. In this manner, the plate 20 is vertically disposed and retained in an upright position outwardly from the receiver bar. Also, plate 20 is provided with one or more holes 28, preferably three to six holes, along the central longitudinal axis or in spaced parallel rows and columns.

The second plate 22, as the frame plate, is affixed in abutting relation to the first plate 20 along the planar surfaces 24 and 26. Plate 22 is provided with one or more securing holes 30, preferably two to eight holes, along its central longitudinal axis, or in spaced parallel rows and columns, and when aligned with a securing hole 28 in plate 20, a fastening element 31 such as a threaded bolt, pin, or the like, is inserted through the aligned holes and attached as with the threaded nut or clip, thereby adjoining the two plates. (See FIG. 4.) It is preferable to provide plate 20 with a plurality of securing holes 28, whereby the vertical position of plate 22 can be adjusted by aligning securing holes 30 with pre-selected holes 28 of the desired height. In this manner, the height of the second plate 22 is adjustable relative to the hitch connecting means 18. This adjustable feature can be important where it is desirable or necessary to adjust the height of the plate in order to allow access to the rear of the vehicle such as the hatch back in a station wagon, to provide an adequate rear view for the driver, or to provide greater ground clearance for vehicles that are low to the ground.

Where desired, the first and second plates 20 and 22, respectively, (the receiver plate and frame plate) can be affixed in one position. Thus, the two plates 20 and 22 can be attached at the flat mating surfaces 24 and 26, respectively, in position by one or more threaded bolts or pins inserted through both plates and fixed by nuts threadedly engaged with the bolts or by other suitable means. Where desired, the two plates can be joined by welding, or by a combination of welding and securing bolts.

As stated above, the mounting apparatus of our invention is utilized for securing or mounting a carrier extending outwardly therefrom, but it should be understood that the carrier, per se, is not part of this invention. That is, a carrier, platform, rack, wheeled platform, or the like, is secured to and extends outwardly from the mounting apparatus or device in a generally horizontal plane. In order to connect a carrier to the mounting apparatus, a suitable retainer means is adjoined to the outer surface or facing of the second plate or frame plate 22, and a carrier is then mounted to the plate and secured and supported by the plate and retainer means. The type and design of the retainer means will depend largely upon the configuration of the carrier and the size of the load intended. For example, as shown in FIG. 1, a horizontally disposed bracket 34 is affixed to the outer surface of the second plate 22. The bracket can be formed separately and then attached as by welding, or by using rivets, or threaded nuts and bolts, or the bracket can be formed integrally with the second plate. Member 35, such as a bar, frame, yoke, crosspiece, or the like, having lateral members 36 is supported by the bracket. Preferably, the contour of the bracket 34 is adapted or designed to correspond to, or be complementary with, the geometry of member 35, such as member 34 having an upwardly-open or concave cross-section as viewed in side elevation so that the concave recess of the bracket will correspond to a yoke or crosspiece having an annular or circular cross-section. Also, both members can have a substantially U-shape configuration, as illustrated, so when adjoined the yoke will abut the bracket and conform to the contour of the bracket. Member 35 is affixed to the bracket and the second plate by any suitable means, such as conventional fastening means, welding, or both. Spaced parallel tines 37, disposed substantially horizontally, may extend from the lateral members 36 and may be of sufficient length and size to serve as a rack or carrier, or a second, separate platform (not shown) may be connected thereto in order to expand the size of the carrier. It should be understood, however, that the bracket 34 and yoke 35 are exemplary only of a suitable retainer means, and the bracket 34 may be omitted from the assembly when utilizing a yoke of sufficient size and strength for the particular application and when strongly affixed to the plate assembly.

Modified retainer means are illustrated in FIGS. 7–16. In accordance with the modifications illustrated, the upper marginal edge of the second plate 22 terminates with an outwardly struck, downwardly opened bracket or flange 38 forming a channel or recess 40 having a substantially U-shape or concave configuration. Where desired, a horizontally disposed bracket 42 is arranged below and spaced from the channel 40. Member 35, as described above, is supported from beneath by the bracket 42, and is contoured so that channel 40 accommodates member 35 so as to be further supported and retained in position by bracket 38. Accordingly, upon assembly, member 35 is inserted into the channel 40 and rests on bracket 42, and the member 35 is then connected to the second plate 22 as by welding and/or by threaded nuts and bolts. In a preferred embodiment, the receiver plate 20 has substantially parallel side flanges or panels 43 and a bottom flange or panel 44 formed perpendicularly to the plate 20 at the marginal edges thereof, and the opposed flanges 43 are provided with coaxially aligned recesses 45. A strut or brace 47 extends between the flanges 43 to strengthen the structure. The frame plate 22 has substantially parallel side flanges or panels 46 formed integrally at the marginal edges thereof, and a horizontal rod 48 extends between and is supported by the two panels. The receiver plate and the frame plate are appropriately sized, in that the outside dimensions of the receiver plate are slightly smaller than the inside dimension between the flanges of the frame plate, so that the frame plate will nest with the receiver plate, and with the planar surfaces of each plate being in abutting engagement. In this manner, the rod 48 is hung or suspended from the recesses 45 in the side panels 43 of the plate 20, thereby providing a hinge-like connection or articulated joint between the two plates. The side flanges of both plates have coaxially aligned holes 49, and when the plates are connected and nested, the fastening element 50 is passed through the holes in order to secure the plates.

As described in the previous embodiment, member 35 includes lateral members 36 and horizontally projecting tines 37, which may project sufficiently outward from the second plate 22 to adequately serve as a platform or rack. Where desired, one or more cross-members or braces 39 extend between the tines in order to strengthen the platform, and the number of cross-members will depend largely on the length of the platform. If the tines are relatively short, and it is desirable to increase the length of the carrier, the tines may be telescopically engaged with tubular ends 48 of a second carrier 50.

It will be observed that with respect to the modifications shown in FIGS. 7–16, the frame plate 22 can be readily removed or detached from the receiver plate 20 when not in use without the need for disassemblying or removing the complete mount from the trailer hitch. Member 35 is affixed to the frame plate, from which may project a carrier or platform, and therefore it is possible to remove the frame plate with the carrier. The other components (i.e., the receiver plate, receiver bar, and trailer hitch) remain in place, and when there is a need to use the carrier, the frame plate (with the carrier) is simply reconnected to the receiver plate.

In another modification of the invention, a second carrier, such as a conventional trailer, can be connected to the mount. As shown in FIGS. 8–16, the mount 12 is modified to provide an opening in alignment with the longitudinal opening in the receiver bar 16 and trailer hitch 14. Thus, the first plate or receiver plate 20 and the second plate or frame plate 22 are provided with slots or holes 52 and 54, respectively, which align when the two plates are in abutting engagement and further align with the opening in the trailer hitch and receiver bar. Preferably, slots 52 and 54 are centrally disposed at the lower marginal edge of each plate. Rigid member 56, such as a second trailer hitch or rack, having a transverse hole 58 and a tongue 60, is adapted to telescopically engage with the tubular receiver bar. The opposed walls of hitch 14 and receiver bar 16 have coaxially aligned holes 15 and 17, respectively. Rigid member is inserted into the orifice of the receiver bar and hitch to bring the holes 15, 17 and 58 into alignment, and a pin and clip, or other suitable fastening means, is passed through these holes to join or connect the members. The lateral tongue 60, provided with hole 61, protrudes beyond the plate 22, and a trailer hitch ball 62, or other suitable connecting means, can be attached to the tongue. A conventional trailer (not shown) can be connected to the hitch ball 62, which will be in addition to the platform carrier. Because the hitch ball 62 is below the platform carrier, the second carrier will not interfere with the platform.

It will be observed that by reason of our invention, the mount provides several advantages, including a facile and versatile means for adjoining a carrier to a vehicle. Further, a cantilevered carrier extending from the mount turns with the vehicle, and therefore eliminates the back-up problem commonly associated with a wheeled trailer attached to the vehicle. Further, it should be understood that the foregoing detailed description has been given for clearness of understanding only, and no unnecessary limitations should be understood therefrom, as modifications will be obvious to those skilled in the art.

What is claimed is:

1. A mount for a cargo carrier on a vehicle having a standard receiver hitch, comprising:
    (a) a hitch connecting means adapted for connecting with the receiver hitch;
    (b) a first plate vertically disposed and affixed to said hitch connecting means, said first plate having a substantially planar surface disposed outwardly from said hitch connecting means;
    (c) a second plate vertically disposed and mounted rearwardly to said first plate, said second plate having a substantially planar surface, said planar surfaces of said first and second plates being adjoined in contacting relationship along a major portion of each of said surfaces, and
    (d) means attached to said second plate adaptable for supporting a cargo carrier.

2. A mount for a cargo carrier according to claim 1 wherein said means attached to said second plate comprises a yoke.

3. A mount for a cargo carrier according to claim 1 wherein said means attached to said second plate comprises a bracket.

4. A mount for a cargo carrier according to claim 2 wherein said means attached to said second plate includes a bracket disposed adjacent said yoke for supporting said yoke.

5. A mount for a cargo carrier according to claim 2 wherein said yoke includes spaced tines extending downwardly and outwardly from said second plate.

6. A mount for a cargo carrier according to claim 1 wherein said second plate is adjustably mounted to said first plate so that the height of said second plate can be adjusted relative to said hitch connecting means.

7. A mount for a cargo carrier according to claim 1 wherein said second plate having a top marginal edge and includes a horizontal rod positioned adjacent to and substantially parallel with said top marginal edge, and said first plate includes substantially parallel side members extending perpendicularly therefrom, said side members having aligned recesses to receive said rod and to retain said second plate in abutting relationship with said first plate.

8. A mount for a cargo carrier according to claim 1 wherein said first and second plates have aligned holes to receive fastening means for adjustably mounting said first plate to said second plate so that the height of said second plate can be adjusted relative to said hitch connecting means.

9. A mount for a cargo carrier on a vehicle having a standard receiver hitch, comprising:
    (a) a hitch connecting means adapted for connecting with the receiver hitch;
    (b) a first plate vertically disposed and affixed to said hitch connecting means, said first plate having a substantially planar surface disposed outwardly from said hitch connecting means;

(c) a second plate vertically disposed and mounted rearwardly to said first plate, said second plate having a substantially planar surface adjoined in abutting relationship with said planar surface of said first plate;

(d) means for adjustably mounting said second plate to said first plate so that the height of said second plate can be adjusted relative to said hitch connecting means; and (e) a yoke attached to said second plate and having spaced tines extending downwardly and outwardly from said second plate and adaptable for supporting a cargo carrier.

10. A mount for a cargo carrier on a vehicle having a standard receiver hitch, comprising:

(a) a hitch connecting means adapted for connecting with the receiver hitch;

(b) a first plate vertically disposed and affixed to said hitch connecting means, said first plate having a substantially planar surface disposed outwardly from said hitch connecting means, and having substantially parallel side members extending perpendicularly therefrom;

(c) a second plate vertically disposed and mounted rearwardly to said first plate, said second plate having a substantially planar surface adjoined in abutting relationship with said planar surface of said first plate;

(d) said second plate having a top marginal edge, a horizontal rod positioned adjacent to and substantially parallel with said top marginal edge;

(e) said side members having aligned recesses adaptable to receive said rod and to retain said second plate in abutting relationship with said first plate;

(f) means for adjustably mounting said second plate to said first plate so that the height of said second plate can be adjusted relative to said hitch connecting means; and (g) a yoke attached to said second plate and having spaced tines extending downwardly and outwardly from said second plate and adaptable for supporting a cargo carrier.

11. A mount for a cargo carrier according to claim 10 wherein said second plate terminates at the top marginal edge with a downwardly turned, outwardly facing flange forming a channel having an inverted concave configuration; said first plate and said second plate appropriately sized so that said second plate will nest with said first plate; and said yoke having a contoured part conforming to the concavity of said channel and adapted to be inserted in said channel and affixed to said second plate, said yoke having downwardly depending and outwardly projecting tines.

12. A mount for a cargo carrier according to any one of claims 1–11 wherein said hitch connecting means comprises a tubular member having a longitudinal opening, said first and second plates having aligned openings for alignment with said longitudinal opening, and an elongated rigid member extending through said openings in said plate and insertable into said longitudinal opening and partially extending outwardly from said plates, fastening means for connecting said rigid member to said hitch connecting means, and means for connecting a second cargo carrier to said rigid member.

13. A mount for a cargo carrier according to claim 12 wherein said second plate is adjustably mounted to said first plate so that the height of said second plate can be adjusted relative to said hitch connecting means.

14. A mount for a cargo carrier according to claim 12 wherein said second plate having a top marginal edge and includes a horizontal rod positioned adjacent to and substantially parallel with said top marginal edge, and said first plate includes substantially parallel side members extending perpendicularly therefrom, said side members having aligned recesses to receive said rod and to retain said second plate in abutting relationship with said first plate.

* * * * *